United States Patent [19]

Burgess

[11] Patent Number: 5,793,121
[45] Date of Patent: Aug. 11, 1998

[54] LOW RESISTANCE CURRENT INTERRUPTER

[75] Inventor: James P. Burgess, Troy, Mich.

[73] Assignee: Electro Mechanical Products, Inc., Rochester Hills, Mich.

[21] Appl. No.: 176,235

[22] Filed: Jan. 3, 1994

[51] Int. Cl.$^6$ ............................................. H02H 3/08
[52] U.S. Cl. ................... 307/10.1; 307/9.1; 335/15; 335/18; 335/176; 361/115; 180/279
[58] Field of Search ............................. 361/93, 115, 194, 361/159, 187; 307/9.1–10.8; 335/166–176, 15, 18; 180/271, 279, 282, 283, 284

[56] References Cited

U.S. PATENT DOCUMENTS

| | | | |
|---|---|---|---|
| 1,576,228 | 3/1926 | Schmieze | 335/174 |
| 1,591,149 | 7/1926 | Waltamath | 200/61.5 |
| 2,013,924 | 9/1935 | Nolte, Jr. | 200/52 |
| 2,854,537 | 9/1958 | Sternburgh | 200/61.5 |
| 3,701,000 | 10/1972 | Basso et al. | 320/64 |
| 3,735,072 | 5/1973 | Six, Jr. | 200/61.45 R |
| 3,824,538 | 7/1974 | Slemp | 340/53 |
| 3,840,036 | 10/1974 | Renk | 137/38 |
| 4,024,520 | 5/1977 | Minks | 340/239 R |
| 4,072,835 | 2/1978 | Burke | 200/61.47 |
| 4,099,509 | 7/1978 | Hashimoto | 123/148 AC |
| 4,351,310 | 9/1982 | Adler et al. | 123/644 |
| 4,530,024 | 7/1985 | Brady | 361/63 |
| 4,533,799 | 8/1985 | De Araujo | 200/52 R |
| 4,581,571 | 4/1986 | Hansen | 320/13 |
| 4,663,537 | 5/1987 | Goldner et al. | 307/10 R |
| 4,812,670 | 3/1989 | Goulet | 307/10.2 |
| 4,867,569 | 9/1989 | Mohara | 356/375 |
| 4,887,511 | 12/1989 | Sugiyama et al. | 91/361 |
| 4,949,060 | 8/1990 | Mikulecky | 337/4 |
| 5,038,006 | 8/1991 | Lowe, Sr. et al. | 200/61.5 |
| 5,272,386 | 12/1993 | Kephart | 307/10.1 |
| 5,327,990 | 7/1994 | Busquets | 307/10.1 |
| 5,359,515 | 10/1994 | Weller | 307/10.1 |
| 5,389,824 | 2/1995 | Moroto | 307/10.1 |

*Primary Examiner*—William M. Shoop, Jr.
*Assistant Examiner*—Peter Ganjian
*Attorney, Agent, or Firm*—Gifford, Krass, Groh, Sprinkle, Patmore, Anderson & Citkowski, P.C.

[57] ABSTRACT

A low resistance current interrupter for detecting the occurrence of an unsafe condition and terminating power to an electrical circuit. The current interrupter comprises two in-line connectors having a gap formed therebetween. An electrically conductive pin is disposed in the gap for movement between a first, extended position, wherein the pin bridges the gap to establish electrical contact between the connectors, to a second, retracted position wherein electrical contact is broken. The device further includes means for sensing the occurrence of an unsafe condition and generating a signal indicative thereof, and an electromechanical means such as a solenoid which, upon receiving said electrical signal, is activated and causes the pin to move to the second position.

16 Claims, 2 Drawing Sheets

LOW RESISTANCE CURRENT INTERRUPTER

BACKGROUND OF THE INVENTION

1. Field of the Invention

This invention relates to the field of current interrupters, and, more particularly, to a low resistance current interrupter for interrupting electric current to a device upon the occurrence of an unsafe condition.

2. Description of the Relevant Prior Art

Electric vehicles operate on high currents and at very high voltages. A typical operating voltage may be in the neighborhood of 350 volts, and may be either direct current or alternating current. In the case of a vehicle crash, the high voltage can present a severe hazard to the occupants of the vehicle or to the rescue personnel. Additionally, the high voltage can do significant secondary damage to the vehicle itself and its contents. Even in a non-crash situation, the high current and voltage can cause rapid and severe damage to the vehicle if a short circuit or similar malfunction occurs. Furthermore, in a vehicle roll over, the fuel pump must be immediately shut down or explosion and/or fire may result. Thus, there is a need for means to rapidly terminate electrical connections at the source (i.e., the battery) in the event of a crash, severe fault conduction or vehicle roll over.

There are a number of devices known in the prior art designed to interrupt electric service to the vehicle from the battery in the event of the occurrence of a crash. Examples of such devices are disclosed in U.S. Pat. Nos.: 1,591,149; 2,013,924; 2,854,537; 3,735,072; 4,072,835; 4,812,670; and 5,038,006. Typically, such devices are inertia switches which have a movable member bridging the gap in the electrical circuitry of the switch, thereby completing the circuit, when the vehicle is operating normally. If the vehicle crashes, or otherwise stops suddenly, the movable member will continue to travel, thus moving out of the gap and breaking the circuit. Of course, such inertia switches suffer from a number of disadvantages including mechanical complexity and a tendency to trigger stoppage of electrical power in inappropriate situations, such as a simple sudden stop. Also, most of these switches have a high resistance and cause a voltage between the source and the load.

In addition to such crash sensors, conventional automobiles typically employ current interrupters in other places in the electrical systems. Such electrical systems must rapidly switch very high levels of current amongst an ever-growing number of electrical components. Generally, each of these components has its own fuse associated therewith; however, conventional fuse devices present several problems. First of all, the fuse functions to protect the circuit but not the component itself. This occurs because the fuse has a value such that, in the event of a high current drain, it will open before the current overheats the circuit excessively. Since the fuse works by melting, significant current flow occurs and damage to the individual component ensues. If a smaller fuse is used, some degree of protection to the delicate component is afforded; however, such a high resistance fuse adds significant series resistance to the circuit and results in nuisance fuse blows. Furthermore, the fuse generates waste heat which, in some instances, is a problem. Also, the threshold of the fuse itself is somewhat sensitive to changing environmental conditions.

Vehicles often employ another type of current interrupter, a roll-over switch which cuts off power to the fuel pump in the case of a vehicle roll-over so that fuel spillage is minimized. Obviously, fuel spillage in such a situation is very dangerous since it can cause explosion and fire. However, typical prior art roll-over switches are mechanical and, in the event they are tripped, must be mechanically remade before the vehicle is again operational.

Therefore, there is a need for a current interrupting device which is useful in high current situations, which has a very low electrical resistance, and which is capable of being rapidly and reliably opened. Additionally, it is desirable that such a device be capable of being reset, and that it may be made to respond to a variety of different input conditions.

SUMMARY OF THE INVENTION

In its broadest aspects, the current interrupter of the present invention comprises a pair of in-line electrical connectors (such as are disclosed in copending U.S. patent application Ser. No. 061,457, assigned to the assignee of the present invention) which are spaced apart to form a gap therebetween. A conductive contact pin is disposed in the gap for movement between a first position, wherein the contact pin bridges the gap between the two connectors to establish electrical contact between them, and a second, retracted position wherein the pin retracts to break the electrical contact. The pin is biased into the second position by a spring or similar biasing means wherein the contact is broken. In a preferred embodiment, the pin is retained in the first position by a solenoid. In response to the input of an electrical signal, the solenoid retracts, causing the spring to move the pin to the second position and break electrical contact. The electrical signal can be inputted from a crash sensor, such as an air bag trigger or from a current flow device associated with various of the components of a vehicle. Alternatively, the switch, itself, may have a current sensor associated therewith for triggering operation of the switch and/or monitoring the flow of any trickle current. It is generally preferred that the current interrupter include some type of reset switch, either mechanical or electrical.

Optionally, the device may include an insulating finger which, when the pin retracts and breaks electrical contact, slides into place to keep the contact open, thus insuring that contact will not be accidentally restored if the device is jarred or otherwise moved. Typically, the insulating finger will be biased to move into the gap created when the pin retracts, but will be kept from movement by the pin when the pin is in its first position.

In one embodiment, the device is incorporated in a vehicle, preferably close to the battery; as noted before, it may be connected to crash sensors and operates immediately to open the major electrical circuits in the event of a crash. In another embodiment, the device may use input from an air bag trigger at a value different from that required for deploying the air bag. The device may also be used to shut off a fuel pump in the case of a vehicle roll over.

In yet other instances, the low resistance current interrupter is connected to electronics associated with various current drawing loads throughout the vehicle. The sensors may be in communication with a controller which can determine if the particular circuitry is operating improperly, based on the input from the various sensors. The controller can then generate a signal which triggers the switch to open quickly, thereby preventing damage to one or more particular electronic devices in the vehicle. The point at which the switch opens can be set far lower than the threshold current required to blow a fuse associated with an electronic component and, in this manner, the component itself is protected. Since the current interrupter of the present invention is of low resistivity, the added series resistance resultant from the use of fuses is eliminated. Also, one such current interrupter, operating in connection with a number of individual sensors, can eliminate the need for a number of fuses. The same switch can be set to open in response to a variety of different operating conditions. Using this approach, the sensors associated with each load can give a diagnostic signal indicating the source of the trigger signal which opens the switch. The particular trouble spot may then be inspected and repaired or disconnected (if not critical), and the current interrupter can be manually or automatically reset to permit the vehicle to continue operation. In some instances, it may be desirable to have a low current line tapped into the battery upstream of the current interrupter to provide a relatively low level of current for operating low load electrical devices such as the clock and logic circuitry associated with the various vehicular systems so that triggering of the current interrupter does not interrupt power to these selected devices.

In yet another embodiment, the device of the present invention may be wired into the battery at a point where it can interrupt current to the rest of the wiring system, which includes a number of high current fuses in different load locations. The purpose of the device so disposed is to prevent current reversal into the vehicle's electrical system when its battery is connected via jumper cables to the battery of another vehicle. This will prevent serious damage to the electrical components of the vehicle caused by such reversal.

BRIEF DESCRIPTION OF THE DRAWINGS

The following detailed description may best be understood with reference to the following drawings, in which.

DETAILED DESCRIPTION OF THE PREFERRED EMBODIMENTS

Figure 1:
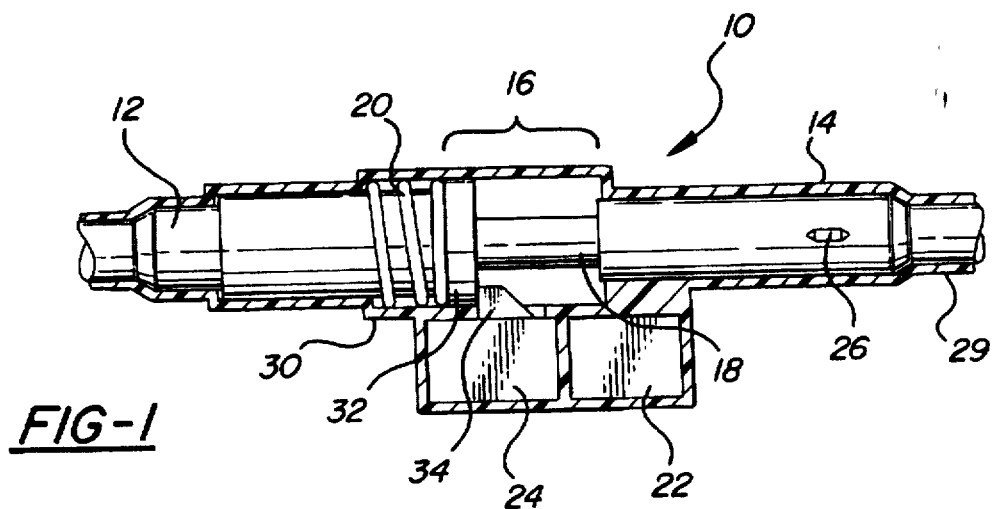
FIG. 1 shows a low resistance current interrupter according to the present invention in its first, extended position.
Figure 2:
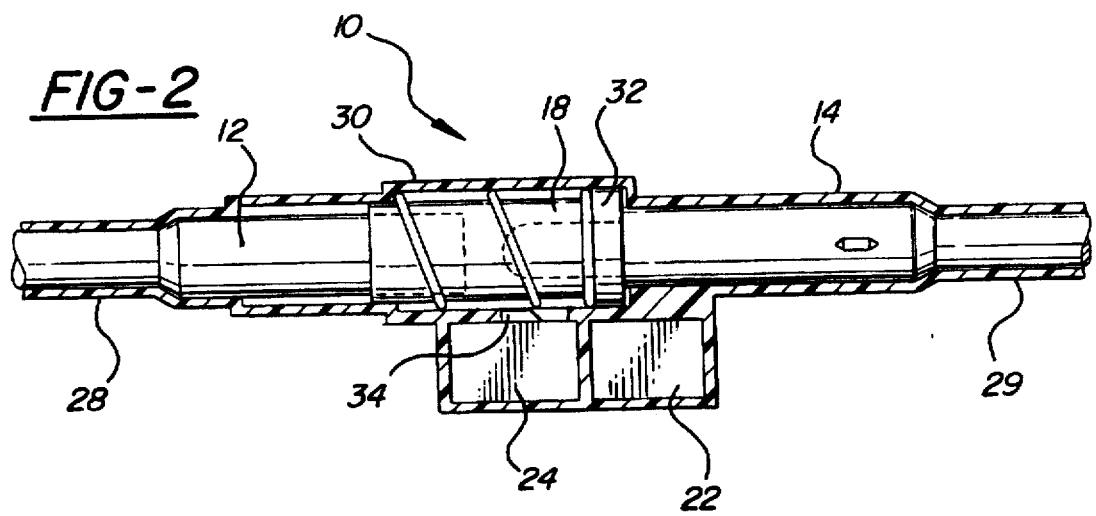
FIG. 2 shows the device of FIG. 1 in its second, retracted position.

Throughout the following detailed description, like numerals are used to reference the same element of the invention shown in multiple figures thereof. Referring now to the drawings, and in particular to FIGS. 1 and 2, there is shown a low resistance circuit interrupter 10 according to the present invention. The circuit interrupter includes a pair of in-line electrical connectors 12,14 (such as described in copending U.S. patent application Ser. No. 061,457, although the present invention is not limited to use with such connectors). The connectors 12,14 are spaced apart to define a gap 16 therebetween. Disposed in the gap 16 is a conductive contact pin 18 which is disposed for movement between a first, extended position (depicted in FIG. 1) and a second, retracted position (depicted in FIG. 2). In the first, extended position, the contact pin bridges the gap 16 between the connectors 12,14 to establish electrical contact therebetween. In the second, retracted position, the pin 18 retracts; as depicted, the pin retracts away from connector 12 back into connector 14, but the reverse arrangement is also possible. After it retracts, the pin 18 is no longer in electrical contact with connector 12, thus breaking electrical contact between connectors 12,14.

A means 26 for sensing an unsafe condition is disposed in electrical communication with connector 14. For example, sensor 26 may be adapted to sense an unsafe condition, such as an electrical overload of the circuit in which the current interrupter 10 is disposed, vehicle roll over, vehicle crash, etc., in which case the sensor 26 will generate an electrical signal in response to the unsafe condition. Sensor 26 may be disposed in one of the connectors 12,14, as depicted, or may be disposed remotely from them. Sensor 26 may be directly in electrical communication with solenoid 24, or there may be an intermediary controller 22 as is shown in the depicted embodiment. In all cases, an activation signal is sent, either from the sensor 26 directly, or from the controller 22, thereby activating solenoid 24.

Solenoid 24 has a projection 34 which is biased to be in the extended position shown in FIG. 1 as long as the solenoid 24 remains deactivated. When in its extended position, projection 34 abuts against disk 32 which is carried by pin 18. Thus, the solenoid 24 holds the pin 18 and disk 32 in the extended position to establish electrical contact between the connectors 12,14.

Coaxially disposed around connector 12 is a helical spring 30 which biases the pin 18 and disk 32 to the second position. Thus, as soon as the solenoid 24 receives an activation signal, either from sensor 26 or controller 22, projection 34 retracts, as is shown in FIG. 2. When projection 34 retracts, it releases disk 32 so that pin 18 is forced by expansion of helical spring 30 into its second, retracted position, thus breaking electrical contact between the connectors 12,14. Thus, upon occurrence of the unsafe condition, the circuit in which circuit interrupter 10 is disposed will cease to carry current.

If, for example, leads 28,29 which extend from, respectively, connectors 12,14 are in electrical communication with a source of power, such as the battery circuit of a vehicle, occurrence of the unsafe condition will cause the engine of the vehicle to stop, as well as virtually all of the electronic components of the vehicle to cease operation. Thus, in one embodiment, sensor 26 could be a conventional crash sensor, and the circuit interrupter 10 would turn off power to all the non critical circuits of the vehicle in the case of a crash, thus lessening the danger of explosion, fire and electrical hazard. Such a system would find particular usefulness in electrically powered vehicles since, typically, such vehicles run at very high voltages and, in the case of accident, it is highly desirable to turn off operation of the electrically powered engine to avoid electrical hazard to rescue personnel.

In another embodiment of the circuit interrupter of the present invention, it may be incorporated into the circuitry of one or more of the vehicle's air bags which typically are provided with their own crash sensors. By employing the existing air bag crash sensor, the internal sensor shown as reference numeral 26 in FIGS. 1 and 2 can be dispensed with.

In yet another embodiment, the device is used as a roll-over switch to shut down operation of the fuel pump in the event of a vehicle roll-over. Prior art roll-over switches have to be mechanically remade after they are tripped. The device of the present invention can be simply reset.

Furthermore, the sensors 42 can be used to generate a diagnostic signal indicating which of the components 40 or circuitry associated therewith is generating the unsafe condition signal. This portion of the circuit can then be disabled until the fault is removed. The embodiment of FIG. 3 also shows a low current line 44 connected to the battery upstream of the current interrupter 10. Line 44 is also connected to clock 46 and logic circuitry 48 so that, in the event current interrupter 10 is activated, current will continue to flow to these critical, low power consumption components.

Figure 3:
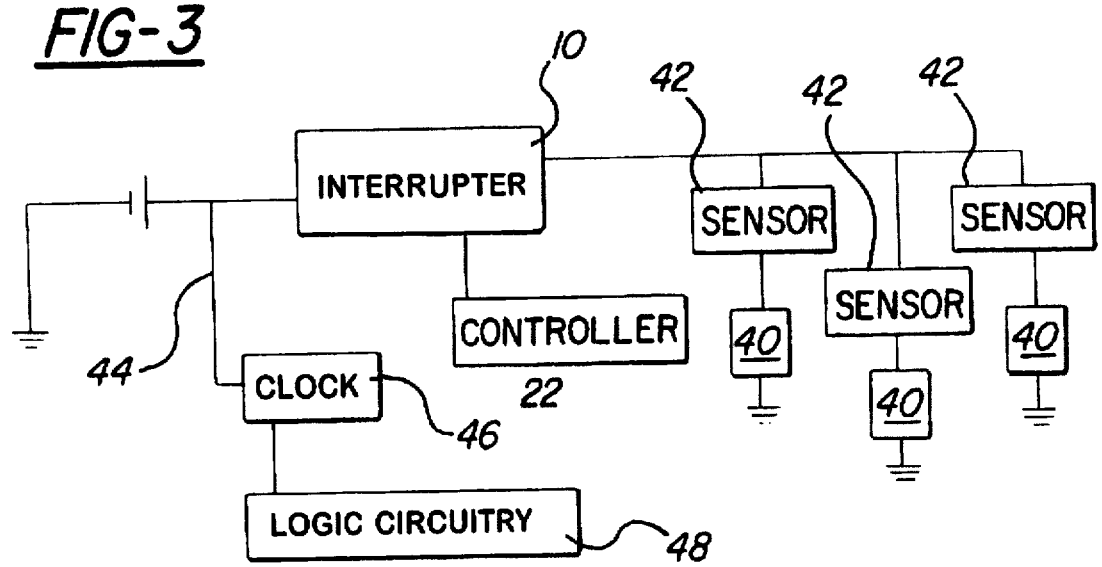
FIG. 3 is a schematic diagram depicting a device according to the present invention used as a circuit interrupter to protect a plurality of electronic components.

Still another embodiment of the present invention is depicted in schematic form in FIG. 3. FIG. 3 shows a circuit diagram wherein a plurality of electrical components 40 are in electrical communication with the circuit interrupter 10 of the present invention. In this embodiment, the controller 22 of the circuit interrupter contains a logic module which is in communication with a plurality of sensors 42 deployed in association with their respective electronic components 40. Signals regarding current load are generated by the sensors 42 and sent to the controller 22. The logic of the controller is configured to compare and evaluate this information in order to sense an unsafe current condition; i.e., a current overload or short circuit. In this event, the controller 22 will send an activation signal to a solenoid in the manner described above to deploy the circuit interrupter, thus preventing damage to delicate electronic components caused by short circuiting and overheating. Use of the current interrupter of the present invention in a "smart system" for vehicle wiring eliminates the need for the multiple fuses used in prior art systems and their attendant disadvantages.

Another embodiment of the present invention finds the device employed to prevent current reversal when the battery of the vehicle is attached to another car's battery via jumper cables. During the jump start process, the current can reverse direction and flow into the vehicle's electrical system. Such a surge of power can damage electrical components. The interrupter of the present invention can be wired between the battery and high current fuses disposed at different load locations to prevent such surges.

In the embodiment depicted in FIGS. 1 and 2, the circuit interrupter 10 may be easily reset by sliding sleeves 30, to which disk 32 is attached, against biasing spring 20 and toward connector 12. Once the sleeve 30 has passed the solenoid projection 34, projection 34 will extend to the position shown in FIG. 1, thus preventing sleeve 30 from returning to the retracted position shown in FIG. 2. Again, contact pin 18 will bridge the gap 16 between the connectors 12,14 so that the circuit will be completed and electrical power will be restored to the system. Of course, other means for resetting the circuit interrupter could be designed without departing from the scope of the present invention.

Figure 4:
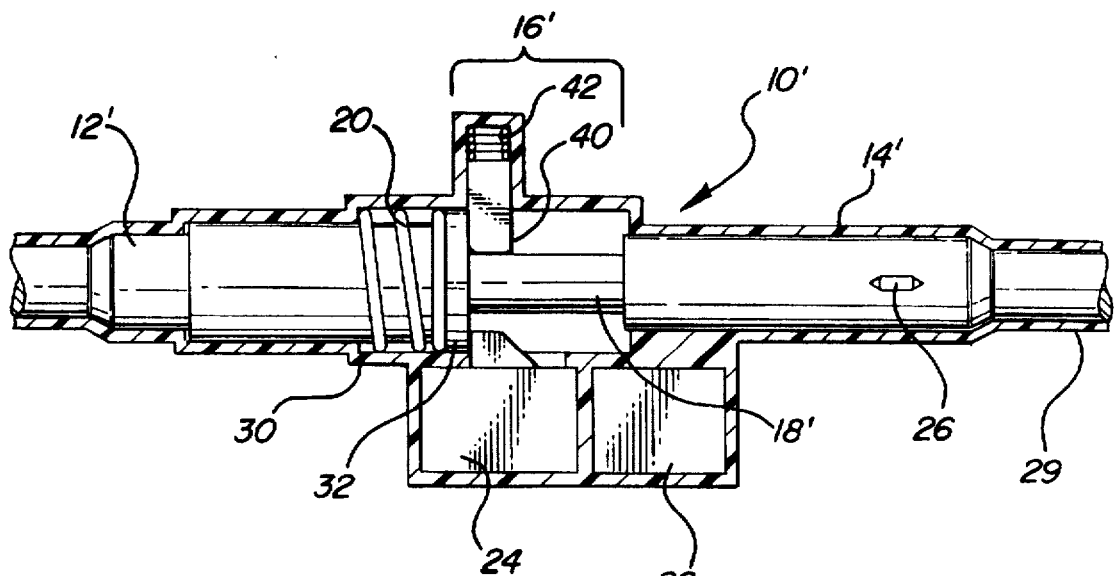
FIG. 4 is a schematic diagram similar to FIG. 3 showing another embodiment of the current interrupter of the present invention with an extended insulating finger.
Figure 5:
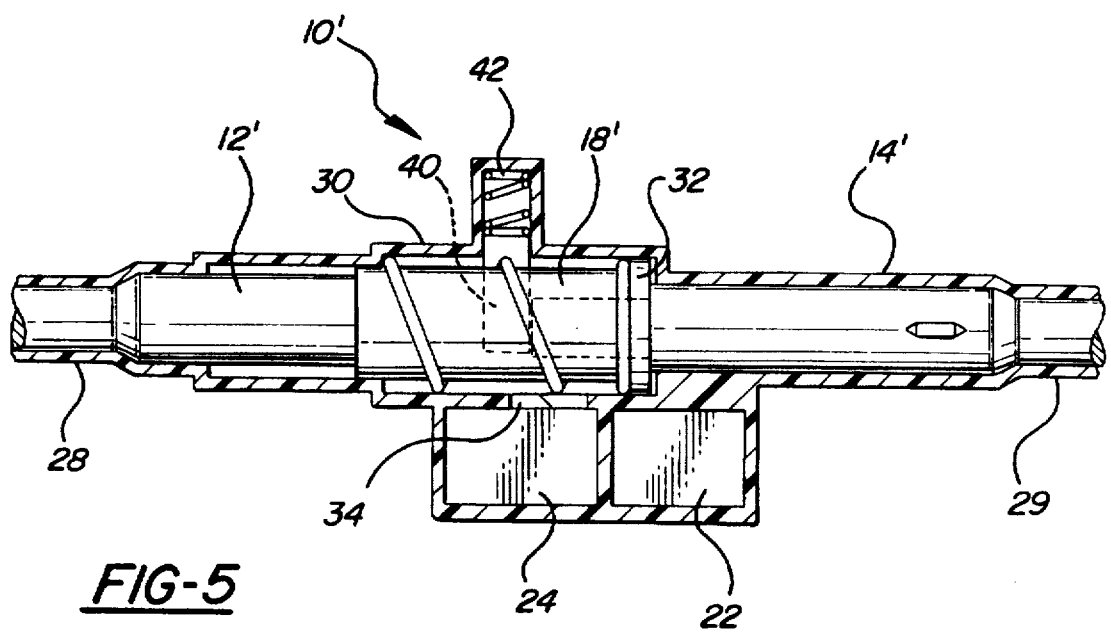
FIG. 5 shows the device of FIG. 4 with the insulating finger retracted.

Yet another embodiment of an interrupter 10' of the present invention is depicted in FIGS. 4 and 5. This interrupter 10' is similar in all respects to the embodiment of FIGS. 1 and 2 except that it also includes an insulating finger 40 which is mounted for movement between a retracted position (depicted in FIG. 4) wherein finger 40 abuts against pin 18', to an extended position wherein finger 40 extends into a portion of the gap 16' between the connectors 12',14' in the manner depicted in FIG. 5. Retraction of the pin 18' opens up a portion of the gap 16' and also frees finger 40 for movement thereinto. Biasing means in the form of spring 42 cause the finger 40 to extend into the gap when the pin 18' retracts and no longer obstructs its movement. As long as insulating finger 40 remains in the gap 16', it prevents the pin 18' from accidental movement toward its first, extended position to reestablish unwanted electrical contact. Thus, in this embodiment, the interrupter 10' must be mechanically reset by retracting the finger 40.

The circuit interrupter of the present invention provides a reliable, low cost, and resettable means of breaking an electrical circuit in the event of an unsafe condition, either to the components of the circuit, itself, or to, for example, to a vehicle in which the device is deployed. The circuit interrupter is also of low resistance even when it is designed to be activated at relatively low current overloads, unlike conventional fuses. The circuit interrupter has been depicted and described with reference to certain embodiments and exemplifications thereof. Doubtless, by varying the design parameters, variations in the inventive concept may occur to one skilled in the art without departing from the scope of the present invention. It is the claims appended hereto and all reasonable equivalents thereof, rather than the depicted exemplifications and embodiments, which define the true scope of the present invention.

I claim:

1. A low resistance current interrupter for use in a vehicle comprising:

a pair of in-line electrical connectors in electrical communication with an electrical system of the vehicle and spaced apart to define a gap therebetween;

a conductive contact pin disposed for movement between a first, extended position wherein the pin bridges the gap to establish electrical contact between said pair of connectors and a second, retracted position wherein the pin retracts to break said contact, said pin being biased to said second position;

a plurality of current sensors disposed in parallel, each of said sensors being disposed at a location in said electrical system for sensing the magnitude of an associated current drawing load upon said electrical system and generating information with respect to said associated current drawing load;

a controller in communication with said plurality of sensors and responsive to said information generated thereby to determine the existence of an unsafe operating condition of said associated current drawing load and generate an electrical signal indicative thereof; and electromechanical means responsive to said signal to release said pin from said first position, said electromechanical means being in a normally off condition with no current flow therethrough, said electrical signal being operative to initiate current flow through said electromechanical means, thereby causing said pin to retract to said second position and break said contact upon the occurrence of said unsafe condition to interrupt current flow through said electrical system.

2. The device of claim 1 wherein said electromechanical means is a solenoid.

3. The device of claim 2 wherein the solenoid further includes a projection biased to an extended position for retaining said pin in its first position, said projection operative to retract upon activation of the solenoid to release said pin.

4. The device of claim 1 wherein said means for sensing is a current sensor and said unsafe condition is a current overload.

5. The device of claim 4 wherein said device is disposed between a battery of a vehicle and a plurality of high resistance fuses disposed at a plurality of current drawing load locations in said vehicle's electrical system to interrupt current to said system in the event of current reversal through said battery.

6. The device of claim 1 wherein said means for sensing further comprises a plurality of current sensors disposed in parallel, each in electrical communication with a current drawing load, and a controller unit in communication with said plurality of current sensors for receiving information generated thereby and determining on the basis of said information the existence of said unsafe condition.

7. The device of claim 1 wherein said device is in electrical communication with a vehicle fuel pump, said means for sensing is a roll-over sensor and said unsafe condition is a vehicle roll-over so that current to said fuel pump will be interrupted upon the occurrence of said vehicle roll-over.

8. The device of claim 1 wherein said current interrupter is deployed in a vehicle, said electrical connectors being in electrical communication with an electrical system of said vehicle, said means for sensing is a crash sensor, and said unsafe condition is a vehicle crash.

9. The device of claim 1 further including means for biasing said pin to said second position.

10. The device of claim 9 wherein said means for biasing is a spring.

11. The device of claim 1 further comprising a sleeve axially disposed around said pair of electrical connectors and a disc disposed for sliding movement inside said sleeve and including a bore formed therethrough, said pin extending through said bore such that said disc is carried by said pin, wherein said electromechanical means includes a solenoid which extends to abut against said disc and hold said pin in said first position and retracts to release said pin into said second position upon activation of said solenoid by said electrical signal.

12. The device of claim 11 further comprising a helical spring coaxially disposed inside said sleeve and operative to bias said pin and disc to said second position.

13. The device of claim 1 further comprising an insulating finger mounted for movement between a first, retracted position wherein the finger abuts against the contact pin when said pin is in its first, extended position, to a second, extended position wherein the insulating finger moves into said gap to prevent electrical contact from being accidentally reestablished.

14. The device of claim 13 further comprising means for biasing said finger into said second, extended position.

15. The device of claim 1 wherein said pair of electrical connectors are disposed in proximity to a battery of said vehicle so as to interrupt current flow from said battery, thereby interrupting operation of said electrical system of said vehicle upon the occurrence of said crash condition.

16. A low resistance current interrupter for use in a vehicle comprising:

a pair of in-line electrical connectors in electrical communication with an electrical system of the vehicle and spaced apart to define a gap therebetween;

a sleeve axially disposed around said pair of electrical connectors;

a disc disposed for sliding movement inside said sleeve and including a bore formed therethrough;

a conductive contact pin extending through bore of said disc such that said disc is carried by said pin, said pin being disposed for movement between a first, extended position wherein the pin bridges the gap to establish electrical contact between said pair of connectors and a second, retracted position wherein the pin retracts to break said contact;

a helical spring coaxially disposed inside said sleeve and operative to bias said pin and disc to said second position;

plurality of current sensors, each of said sensors being disposed at a location in said electrical system for sensing the magnitude of an associated current drawing load upon said electrical system and generating with respect to said associated current drawing load;

a controller in communication with said plurality of sensors and responsive to said information generated thereby to determine the existence of an unsafe operating condition of said electrical system and generate an electrical signal indicative thereof; and a solenoid which extends to abut against said disc and hold said pin in said first position and retracts to release said pin into said second position, said solenoid being in a normally off condition with no current flow therethrough, said sensor means being operative to initiate current flow through said solenoid, thereby releasing said pin into said second position to break said contact upon the occurrence of said unsafe condition, said solenoid further including a projection biased to an extended position for retaining said pin in its first position, said projection operative to retract upon activation of the solenoid to release said pin.

* * * * *

UNITED STATES PATENT AND TRADEMARK OFFICE
CERTIFICATE OF CORRECTION

PATENT NO. : 5,793,121
DATED : August 11, 1998
INVENTOR(S) : Burgess

It is certified that error appears in the above-identified patent and that said Letters Patent is hereby corrected as shown below:

Column 4, lines, 25 and 30, delete "30" and insert --20--.

Column 2, line 31, "of the" should be deleted.

Signed and Sealed this

Sixteenth Day of February, 1999

Attest:

*Attesting Officer*

*Acting Commissioner of Patents and Trademarks*